(12) United States Patent
Anzai

(10) Patent No.: US 8,206,031 B2
(45) Date of Patent: Jun. 26, 2012

(54) PDM OUTPUT TEMPERATURE SENSOR

(75) Inventor: Ryoichi Anzai, Chiba (JP)

(73) Assignee: Seiko Instruments Inc., Chiba (JP)

( * ) Notice: Subject to any disclaimer, the term of this patent is extended or adjusted under 35 U.S.C. 154(b) by 489 days.

(21) Appl. No.: 12/582,962

(22) Filed: Oct. 21, 2009

(65) Prior Publication Data

US 2010/0103979 A1  Apr. 29, 2010

(30) Foreign Application Priority Data

Oct. 28, 2008 (JP) ................. 2008-276302

(51) Int. Cl.
    *G01K 7/00* (2006.01)
(52) U.S. Cl. ............... 374/173; 374/178; 374/E7.001
(58) Field of Classification Search .............. 374/173, 374/178, 164, E7.001, E7.035
    See application file for complete search history.

(56) References Cited

U.S. PATENT DOCUMENTS

| | | | |
|---|---|---|---|
| 6,183,131 B1 | 2/2001 | Holloway et al. | |
| 7,901,134 B2 * | 3/2011 | Sudo | 374/173 |
| 8,152,363 B2 * | 4/2012 | Nagahisa | 374/170 |
| 2003/0123520 A1 * | 7/2003 | Tesi | 374/178 |
| 2005/0017889 A1 | 1/2005 | Stockstad | |
| 2009/0059997 A1 * | 3/2009 | Sudo | 374/173 |
| 2009/0296780 A1 * | 12/2009 | Lee et al. | 374/178 |
| 2010/0008398 A1 * | 1/2010 | Nojima | 374/178 |
| 2010/0103979 A1 * | 4/2010 | Anzai | 374/173 |
| 2010/0111137 A1 * | 5/2010 | Chen et al. | 374/178 |
| 2011/0158286 A1 * | 6/2011 | Peterson | 374/170 |
| 2011/0221931 A1 * | 9/2011 | Wakabayashi et al. | 374/170 |

OTHER PUBLICATIONS

Pertijis, Michiel A.P. et al., "A Sigma-Delta Modulator with Bitstream-Controlled Dynamic Element Matching," IEEE, 2004, pp. 187-190.
Pertijis, Michiel A.P. et al., "A CMOS Smart Temperature Sensor With a 3σ Inaccuracy of ±0.1° C From -55° C to 125° C," IEEE Journal of Solid-State Circuits, vol. 40, No. 12, Dec. 2005, pp. 2805-2815.
Extended European Search Report for European Application No. 09174245.2, dated Feb. 25, 2011, 6 pages.

* cited by examiner

*Primary Examiner* — Yaritza Guadalupe-McCall
(74) *Attorney, Agent, or Firm* — Brinks Hofer Gilson & Lione

(57) ABSTRACT

To provide a PDM output temperature sensor, which is reduced in area and consumption power, provided is a PDM output temperature sensor which includes no reference voltage circuit, thereby having a smaller area and consuming less power correspondingly.

5 Claims, 11 Drawing Sheets ly the reference voltage $V_{HREF}$ by a
factor (1/C) to output a reference voltage $V_0$, a temperature
detection circuit 104 that generates a temperature dependent
voltage $V_{TEMP}$, and an analog to digital converter (ADC) 112
that outputs a digital signal based on the reference voltage $V_0$
and the temperature dependent voltage $V_{TEMP}$ (see, for
example, U.S. Pat. No. 6,183,131).

PDM OUTPUT TEMPERATURE SENSOR

RELATED APPLICATIONS

This application claims priority under 35 U.S.C. §119 to Japanese Patent Application No. JP2008-276302 filed on Oct. 28, 2008, the entire content of which is hereby incorporated by reference.

BACKGROUND OF THE INVENTION

1. Field of the Invention

The present invention relates to a pulse density modulation (PDM) output temperature sensor.

2. Description of the Related Arts

Currently, a temperature sensor that outputs a digital signal based on a temperature is included in a variety of electronic devices. FIG. 11 is a block diagram illustrating a conventional temperature sensor.

The conventional temperature sensor includes a reference voltage circuit 102 that generates a bandgap reference voltage $V_{REF}$, a temperature detection circuit 106 that corrects a temperature dependent voltage to generate a voltage $V_{CORR}$, a circuit 108 that outputs a reference voltage $V_{HREF}$ based on the bandgap reference voltage $V_{REF}$ and the voltage $V_{CORR}$, a circuit 110 that multiplies the reference voltage $V_{HREF}$ by a factor (1/C) to output a reference voltage $V_0$, a temperature detection circuit 104 that generates a temperature dependent voltage $V_{TEMP}$, and an analog to digital converter (ADC) 112 that outputs a digital signal based on the reference voltage $V_0$ and the temperature dependent voltage $V_{TEMP}$ (see, for example, U.S. Pat. No. 6,183,131).

However, the conventional temperature sensor uses the reference voltage circuit 102. Accordingly, the conventional temperature sensor requires a larger area and consumes more power correspondingly.

SUMMARY OF THE INVENTION

The present invention has been made in view of the above, and an object of the present invention is therefore to provide a pulse density modulation (PDM) output temperature sensor that may be reduced in area and consumption power.

In order to solve the above-mentioned problem, the present invention provides a PDM output temperature sensor including: a first constant current source provided between a power supply terminal and a seventh node; a second constant current source provided between the power supply terminal and an eighth node; a first switch provided between the seventh node and a first node; a second switch provided between the seventh node and a fourth node; a third switch provided between the eighth node and the first node; a fourth switch provided between the eighth node and the fourth node; a first PNP bipolar transistor having a base and a collector connected to a ground terminal, and an emitter connected to the first node; a second PNP bipolar transistor having a base and a collector connected to the ground terminal, and an emitter connected to the fourth node; a fifth switch and a first capacitor provided between the first node and a second node in the stated order; an eighth switch provided between the second node and a third node; a sixth switch and a second capacitor provided between the first node and the second node in the stated order; a ninth switch and a third capacitor provided between the second node and the third node in the stated order; a seventh switch provided between the ground terminal and a connection point between the sixth switch and the second capacitor; a tenth switch and a fourth capacitor provided between the fourth node and a fifth node in the stated order; a thirteenth switch provided between the fifth node and a sixth node; an eleventh switch and a fifth capacitor provided between the fourth node and the fifth node in the stated order; a fourteenth switch and a sixth capacitor provided between the fifth node and the sixth node in the stated order; a twelfth switch provided between the ground terminal and a connection point between the eleventh switch and the fifth capacitor; an amplifier having a non-inverting input terminal connected to the second node, an inverting input terminal connected to the fifth node, a non-inverting output terminal connected to the sixth node, and an inverting output terminal connected to the third node; a comparator having a non-inverting input terminal connected to the third node, and an inverting input terminal connected to the sixth node; a latch having an input terminal connected to an output terminal of the comparator; an inverter having an input terminal connected to an output terminal of the latch, and an output terminal connected to an output terminal of the PDM output temperature sensor; and an oscillation circuit for controlling each of the first switch, the second switch, the third switch, the fourth switch, the sixth switch, the seventh switch, the eighth switch, the ninth switch, the eleventh switch, the twelfth switch, the thirteenth switch, the fourteenth switch, and the latch.

In order to solve the above-mentioned problem, the present invention provides a PDM output temperature sensor including: a first constant current source provided between a power supply terminal and a seventh node; a second constant current source provided between the power supply terminal and an eighth node; a first switch provided between the seventh node and a first node; a second switch provided between the seventh node and a fourth node; a third switch provided between the eighth node and the first node; a fourth switch provided between the eighth node and the fourth node; a first PNP bipolar transistor having a base and a collector connected to a ground terminal, and an emitter connected to the first node; a second PNP bipolar transistor having a base and a collector connected to the ground terminal, and an emitter connected to the fourth node; a fifth switch and a first capacitor provided between the first node and a second node in the stated order; an eighth switch provided between the second node and a third node; a sixth switch, a fifteenth switch, and a second capacitor provided between the first node and the second node in the stated order; a ninth switch and a third capacitor provided between the second node and the third node in the stated order; a seventh switch provided between the ground terminal and a connection point between the sixth switch and the second capacitor; a tenth switch and a fourth capacitor provided between the fourth node and a fifth node in the stated order; a thirteenth switch provided between the fifth node and a sixth node; an eleventh switch, a sixteenth switch, and a fifth capacitor provided between the fourth node and the fifth node in the stated order; a fourteenth switch and a sixth capacitor provided between the fifth node and the sixth node in the stated order; a twelfth switch provided between the ground terminal and a connection point between the eleventh switch and the fifth capacitor; an amplifier having a non-inverting input terminal connected to the second node, an inverting input terminal connected to the fifth node, a non-inverting output terminal connected to the sixth node, and an inverting output terminal connected to the third node; a comparator having a non-inverting input terminal connected to the third node, and an inverting input terminal connected to the sixth node; a latch having an input terminal connected to an output terminal of the comparator; an inverter having an input terminal connected to an output terminal of the latch, and an output terminal connected to an output terminal of the PDM output temperature sensor; and an oscillation circuit for controlling each of the first switch, the second switch, the third switch, the fourth switch, the sixth switch, the seventh switch, the eighth switch, the ninth switch, the eleventh switch, the twelfth switch, the thirteenth switch, the fourteenth switch, and the latch.

According to the present invention, the PDM output temperature sensor does not use the reference voltage circuit. Accordingly, the PDM output temperature sensor requires a smaller area and consumes less power correspondingly.

DETAILED DESCRIPTION OF THE PREFERRED EMBODIMENTS

Hereinafter, embodiments of the present invention are described with reference to the drawings.

<First Embodiment>

Figure 1:
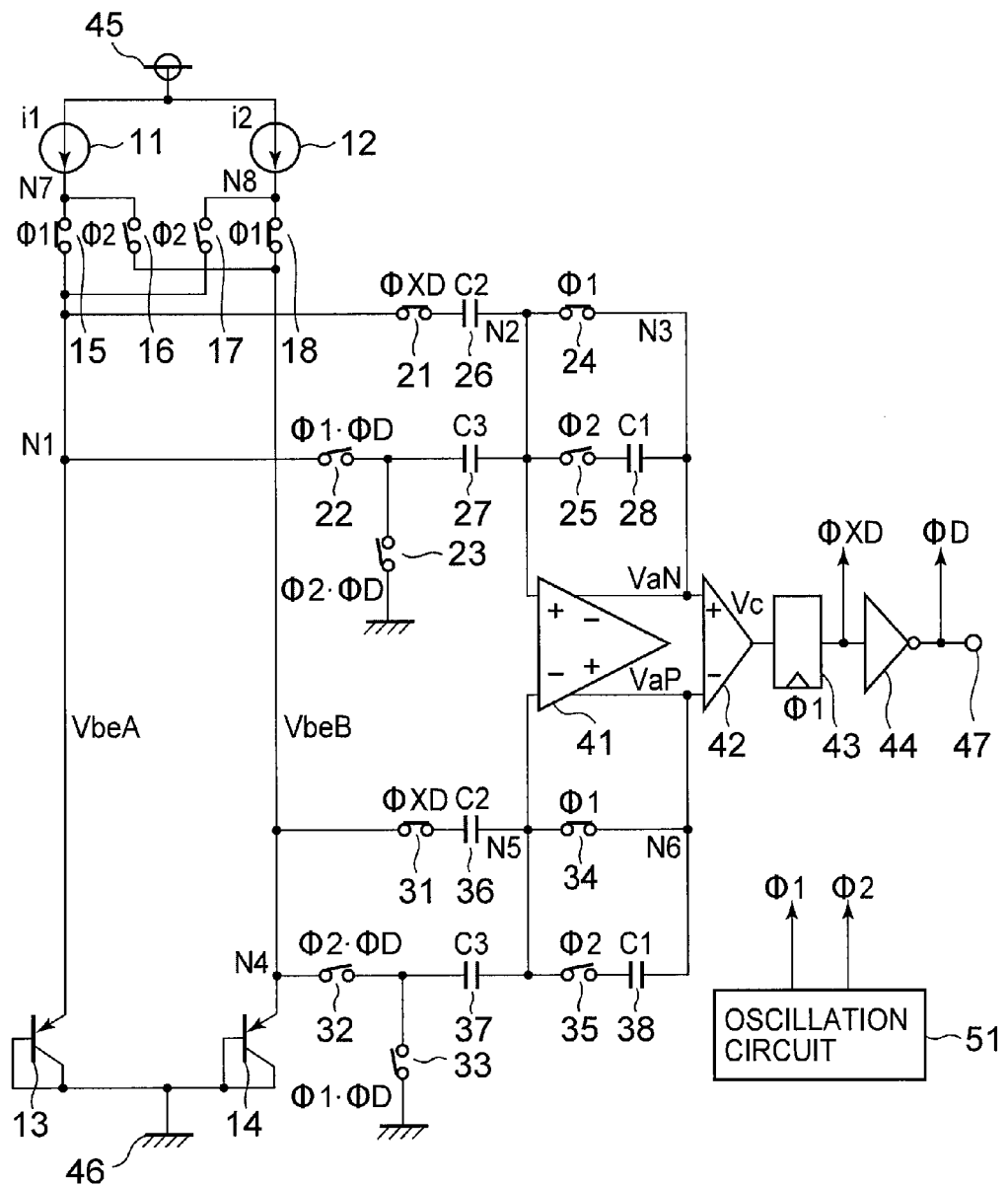
FIG. 1 is a block diagram illustrating a PDM output temperature sensor according to a first embodiment of the present invention.

First, a structure of a pulse density modulation (PDM) output temperature sensor according to a first embodiment of the present invention is described. FIG. 1 is a block diagram illustrating the PDM output temperature sensor according to the first embodiment of the present invention.

The PDM output temperature sensor according to the first embodiment of the present invention includes a power supply terminal 45, a ground terminal 46, and an output terminal 47. The PDM output temperature sensor according to the first embodiment of the present invention further includes nodes N1 to N8.

The PDM output temperature sensor according to the first embodiment of the present invention includes constant current sources 11 and 12, PNP bipolar transistors (PNPs) 13 and 14, switches 15 to 18, switches 21 to 25, switches 31 to 35, capacitors 26 to 28, capacitors 36 to 38, an amplifier 41, a comparator 42, a latch 43, an inverter 44, and an oscillation circuit 51.

The constant current source 11 is provided between the power supply terminal 45 and the node N7. The constant current source 12 is provided between the power supply terminal 45 and the node N8. The switch 15 is provided between the node N7 and the node N1. The switch 16 is provided between the node N7 and the node N4. The switch 17 is provided between the node N8 and the node N1. The switch 18 is provided between the node N8 and the node N4. The PNP 13 has a base and a collector connected to the ground terminal 46, and an emitter connected to the node N1. The PNP 14 has a base and a collector connected to the ground terminal 46, and an emitter connected to the node N4.

The switch 21 and the capacitor 26 are provided between the node N1 and the node N2 in the stated order. The switch 24 is provided between the node N2 and the node N3. The switch 22 and the capacitor 27 are provided between the node N1 and the node N2 in the stated order. The switch 25 and the capacitor 28 are provided between the node N2 and the node N3 in the stated order. The switch 23 is provided between the ground terminal 46 and a connection point between the switch 22 and the capacitor 27.

The switch 31 and the capacitor 36 are provided between the node N4 and the node N5 in the stated order. The switch 34 is provided between the node N5 and the node N6. The switch 32 and the capacitor 37 are provided between the node N4 and the node N5 in the stated order. The switch 35 and the capacitor 38 are provided between the node N5 and the node N6 in the stated order. The switch 33 is provided between the ground terminal 46 and a connection point between the switch 32 and the capacitor 37.

The amplifier 41 has a non-inverting input terminal connected to the node N2, an inverting input terminal connected to the node N5, a non-inverting output terminal connected to the node N6, and an inverting output terminal connected to the node N3. The comparator 42 has a non-inverting input terminal connected to the node N3, an inverting input terminal connected to the node N6, and an output terminal connected to an input terminal of the latch 43. The latch 43 has an output terminal connected to an input terminal of the inverter 44. The inverter 44 has an output terminal connected to the output terminal 47.

The oscillation circuit 51 transmits a signal Φ1 to the switch 15, the switch 18, the switch 22, the switch 24, the switch 33, and the switch 34, the signal Φ1 to the latch 43, and a signal Φ2 to the switch 16, the switch 17, the switch 23, the switch 25, the switch 32, and the switch 35. The latch 43 transmits a signal ΦXD to the switch 21 and the switch 31. The inverter 44 transmits a signal ΦD to the switch 22, the switch 23, the switch 32, and the switch 33.

When each signal becomes high, the switches corresponding to the signal are turned ON. Also, when the signal Φ1 becomes high, the latch 43 stores and outputs a voltage Vc at the time point.

Figure 2:
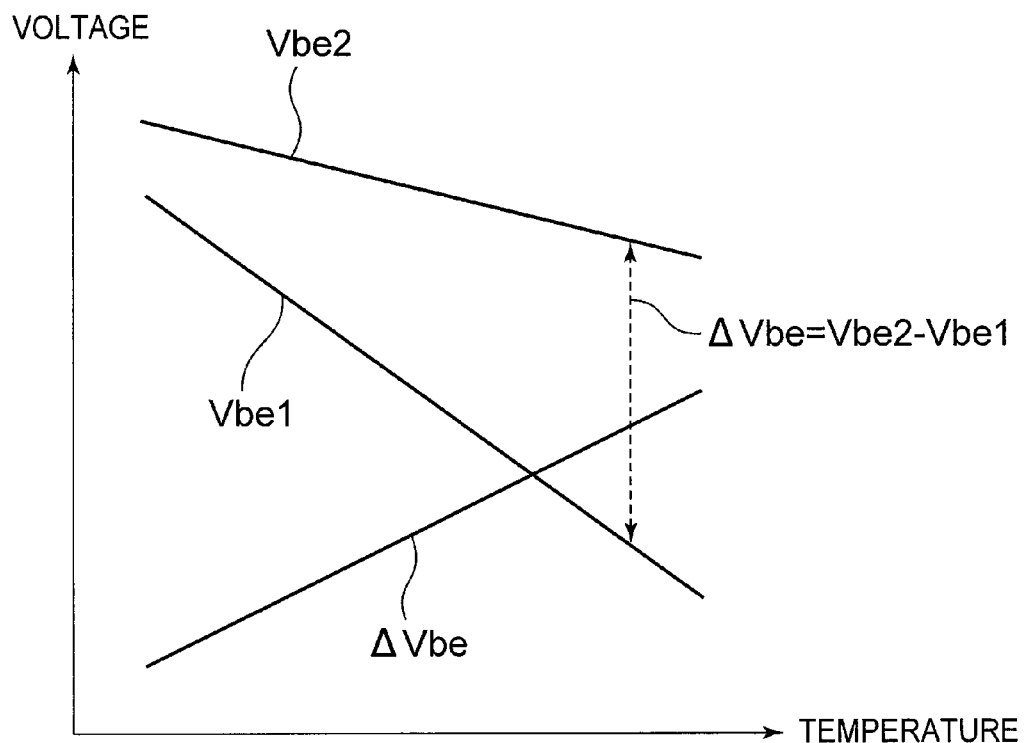
FIG. 2 is a graph illustrating changes in voltages Vbe1 and Vbe2 and differential voltage ΔVbe in accordance with a change in temperature, of the PDM output temperature sensor according to the first embodiment of the present invention.

Next, changes in emitter voltages of the PNP 13 based on a change in temperature are described. FIG. 2 is a graph illustrating changes in voltages Vbe1 and Vbe2 and differential voltage ΔVbe based on the change in temperature.

When the PNP 13 allows a constant current i1 of the constant current source 11 to flow therethrough, the emitter of the PNP 13 generates the voltage Vbe1. When the PNP 13 allows a constant current i2 of the constant current source 12 to flow therethrough, the emitter of the PNP 13 generates the voltage Vbe2. The differential voltage ΔVbe is a voltage obtained by subtracting the voltage Vbe1 from the voltage Vbe2 (Vbe2−Vbe1).

Each of the voltages Vbe1 and Vbe2 has a negative temperature coefficient. With the constant current i2 being larger than the constant current i1, the voltage Vbe2 is higher than the voltage Vbe1, and the voltage Vbe2 has a gentler slope than the voltage Vbe1. The differential voltage ΔVbe has a positive temperature coefficient.

The same holds true for the PNP 14.

Figure 3:
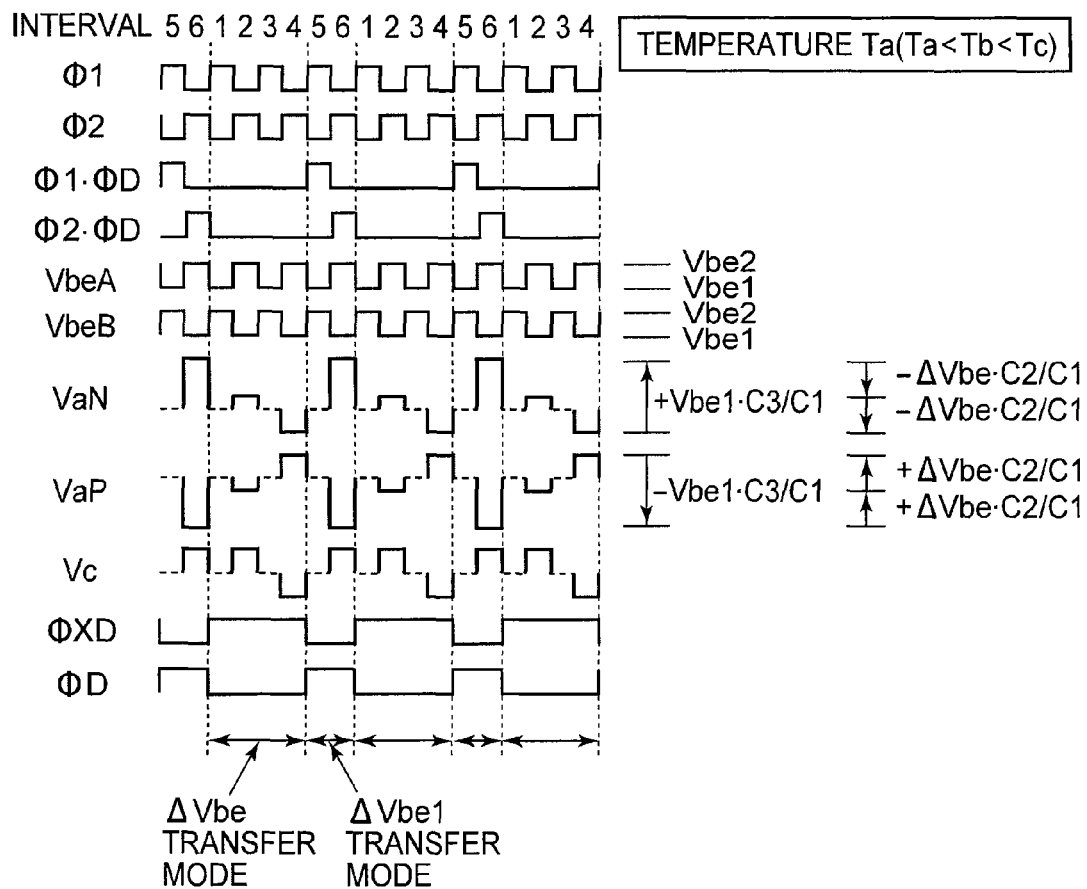
FIG. 3 is a time chart at a temperature Ta of the PDM output temperature sensor according to the first embodiment of the present invention.

Next, an operation of the PDM output temperature sensor at a temperature Ta, according to the first embodiment of the present invention is described. FIG. 3 is a time chart at the temperature Ta. Herein, a signal Φ1·ΦD is a signal obtained by a logical conjunction (AND) of the signal Φ1 and the signal ΦD, and a signal Φ2·ΦD is a signal obtained by a logical conjunction (AND) of the signal Φ2 and the signal ΦD.

[Operation in Interval 1 (ΔVbe Transfer Mode)]

When the signal Φ1 becomes high and the signal Φ2 becomes low, the constant current i1 is caused to flow through the PNP 13 to set the voltage VbeA to the voltage Vbe1, and the constant current i2 is caused to flow through the PNP 14 to set the voltage VbeB to the voltage Vbe2. Assume that the voltage across the node N2 is 0 V. Then, when a capacitance value of the capacitor 26 is C2, electric charges Q2 to be charged to the capacitor 26 are calculated as follows.

$$Q2 = C2 \cdot (Vbe1 - 0) = C2 \cdot Vbe1 \qquad (1)$$

At this time, only the capacitor 26 and the capacitor 36 are operating as input capacitance. Note that with the voltage Vc being high in an interval 6, the rising edge of the signal Φ1 causes the signal ΦD to also become high (and the PDM output temperature sensor enters the ΔVbe transfer mode), and the inverter 44 causes the signal ΦD to become low. Therefore, the signal Φ1·ΦD and the signal Φ2·ΦD also become low.

[Operation in Interval 2 (ΔVbe Transfer Mode)]

When the signal Φ1 becomes low and the signal Φ2 becomes high, the constant current i2 is caused to flow through the PNP 13 to set the voltage VbeA to the voltage Vbe2, and the constant current i1 is caused to flow through the PNP 14 to set the voltage VbeB to the voltage Vbe1. Assume that the voltage across the node N2 is 0 V. Then, the electric charges Q2 to be charged to the capacitor 26 are calculated as follows.

$$Q2 = C2 \cdot (Vbe2 - 0) = C2 \cdot Vbe2 \qquad (2)$$

At this time, only the capacitor 26 and the capacitor 36 are operating as input capacitance. In this case, differential electric charges in the capacitor 26 are transferred to the capacitor 28. Assume that the voltage across the node N2 is 0 V. Then, when a voltage across the node N3 is VaN and a capacitance value of the capacitor 28 is C1, the electric charges Q1 to be charged to the capacitor 28 are calculated as follows.

$$Q1 = C1 \cdot (VaN - 0) = C1 \cdot VaN \qquad (3)$$

Based on the equations (1) to (3), the following equation is satisfied.

$$C2 \cdot Vbe1 - C2 \cdot Vbe2 = -C2 \cdot \Delta Vbe = C1 \cdot VaN \qquad (4)$$

Therefore, the following equation is satisfied.

$$VaN = -\Delta Vbe \cdot C2/C1 \qquad (5)$$

That is, the voltage VaN in an interval 2 is lower than the voltage VaN in the interval 6 by a value obtained by the expression (5). In addition, a voltage VaP across the node N6, which transitions oppositely to the voltage VaN, is calculated as follows.

$$VaP = \Delta Vbe \cdot C2/C1 \qquad (5a)$$

That is, the voltage VaP in the interval 2 is higher than the voltage VaP in the interval 6 by a value obtained by the expression (5a). However, with the voltage VaN being a positive voltage with respect to a bias point and the voltage VaP being a negative voltage with respect to a bias point, the voltage Vc is high. Note that with the voltage Vc being high in the interval 6, the rising edge of the signal Φ1 causes the signal ΦXD to also become high (and the PDM output temperature sensor enters the ΔVbe transfer mode), and the inverter 44 causes the signal ΦD to become low. Therefore, the signal Φ1·ΦD and the signal Φ2·ΦD also become low.

[Operation in Interval 3 (ΔVbe Transfer Mode)]

The PDM output temperature sensor operates as in the interval 1 in terms of the signals.

[Operation in Interval 4 (ΔVbe Transfer Mode)]

The interval 2 and an interval 4 are the same in terms of the signal Φ1, the signal Φ2, the voltage VbeA, and the voltage VbeB. In addition, as in the interval 2, the equation (5) holds true. That is, the voltage VaN in the interval 4 is lower than the voltage VaN in the interval 2 by the value obtained by the equation (5). Further, as in the interval 2, the equation (5a) holds true. That is, the voltage VaP in the interval 4 is higher than the voltage VaP in the interval 2 by the value obtained by the equation (5a). In this case, with the voltage VaN being a negative voltage with respect to the bias point and the voltage VaP being a positive voltage with respect to the bias point, the voltage Vc is low. Note that with the voltage Vc being high in the interval 2, the rising edge of the signal Φ1 causes the signal ΦXD to also become high (and the PDM output temperature sensor enters the ΔVbe transfer mode), and the inverter 44 causes the signal ΦD to become low. Therefore, the signal Φ1·ΦD and the signal Φ2·ΦD also become low.

In the intervals 1 to 4, with the differential voltage ΔVbe being minus when the signal ΦD is low, the voltage VaN becomes lower than the bias point, the voltage VaP becomes higher than the bias point, and the voltage Vc becomes low. Then, in the following intervals 5 and 6, the PDM output temperature sensor operates so that, with the voltage Vbe1 being plus when the signal ΦD is high, the voltage VaN becomes higher than the bias point, the voltage VaP becomes lower than the bias point, and the voltage Vc becomes high. In other words, the PDM output temperature sensor operates so that a voltage obtained by subtracting the voltage VaP from the voltage VaN at the input terminal of the comparator 42 becomes 0 V. Specifically, after the interval 4, the PDM output temperature sensor changes from the ΔVbe transfer mode in which the voltage VaN is set low and the voltage VaP is set high to a Vbe1 transfer mode in which the voltage VaN is set high and the voltage VaP is set low. In the Vbe1 transfer mode, a voltage based on the voltage Vbe1 is added to the voltage VaN and the voltage based on the voltage Vbe1 is subtracted from the voltage VaP until the voltage Vc becomes high.

[Operation in Interval 5 (Vbe1 Transfer Mode)]

When the signal Φ1 becomes high and the signal Φ2 becomes low, the constant current i1 is caused to flow through the PNP 13 to set the voltage VbeA to the voltage Vbe1, and the constant current i2 is caused to flow through the PNP 14 to set the voltage VbeB to the voltage Vbe2. Assume that the voltage across the node N2 is 0 V. Then, when a capacitance value of the capacitor 27 is C3, electric charges Q3 to be charged to the capacitor 27 are calculated as follows.

$$Q3 = C3 \cdot (Vbe1 - 0) = C3 \cdot Vbe1 \qquad (6)$$

At this time, only the capacitor 27 and the capacitor 37 are operating as input capacitance. Note that with the voltage Vc being low in the interval 4, the rising edge of the signal Φ1 causes the signal ΦXD to also become low (and the PDM output temperature sensor enters the Vbe1 transfer mode), and the inverter 44 causes the signal ΦD to become high. Therefore, the signal Φ1·ΦD becomes high and the signal Φ2·ΦD becomes low.

[Operation in Interval 6 (Vbe1 Transfer Mode)]

When the signal Φ1 becomes low and the signal Φ2 becomes high, the signal Φ1·ΦD becomes low and the signal Φ2·ΦD becomes high. Accordingly, not the voltage VbeA but a ground voltage VSS is applied to the capacitor 27. Assume that the voltage across the node N2 is 0 V. Then, the electric charges Q3 to be charged to the capacitor 27 are calculated as follows.

$$Q3 = C3 \cdot 0 = 0 \quad (7)$$

At this time, only the capacitor 27 and the capacitor 37 are operating as input capacitance. In this case, differential electric charges in the capacitor 27 are transferred to the capacitor 28. Assume that the voltage across the node N2 is 0 V. Then, the electric charges Q1 to be charged to the capacitor 28 are calculated as follows.

$$Q1 = C1 \cdot (VaN - 0) = C1 \cdot VaN \quad (3)$$

Based on the equations (3), (6), and (7), the following equation is satisfied.

$$C3 \cdot Vbe1 - 0 = C3 \cdot Vbe1 = C1 \cdot VaN \quad (8)$$

Therefore, the following equation is satisfied.

$$VaN = Vbe1 \cdot C3/C1 \quad (9)$$

That is, the voltage VaN in the interval 6 is higher than the voltage VaN in the interval 4 by a value obtained by the expression (9). In addition, the voltage VaP across the node N6, which transitions oppositely to the voltage VaN, is calculated as follows.

$$VaP = -Vbe1 \cdot C3/C1 \quad (9a)$$

That is, the voltage VaP in the interval 6 is lower than the voltage VaP in the interval 4 by a value obtained by the expression (9a). With the voltage VaN being a positive voltage with respect to a bias point and the voltage VaP being a negative voltage with respect to a bias point, the voltage Vc is high. Note that with the voltage Vc being low in the interval 4, the rising edge of the signal Φ1 causes the signal ΦXD to also become low (and the PDM output temperature sensor enters the Vbe1 transfer mode), and the inverter 44 causes the signal ΦD to become high. Therefore, the signal Φ1·ΦD becomes low and the signal Φ2·ΦD becomes high.

In the intervals 5 and 6, with the voltage Vbe1 being plus when the signal ΦD is high, the voltage VaN becomes higher than the bias point, the voltage VaP becomes lower than the bias point, and the voltage Vc becomes high. Then, in the following intervals 1 to 4, the PDM output temperature sensor operates so that, with the differential voltage ΔVbe being minus when the signal ΦD is low, the voltage VaN becomes lower than the bias point, the voltage VaP becomes higher than the bias point, and the voltage Vc becomes low. In other words, the PDM output temperature sensor operates so that the voltage obtained by subtracting the voltage VaP from the voltage VaN at the input terminal of the comparator 42 becomes 0 V. Specifically, after the interval 6, the PDM output temperature sensor changes from the Vbe1 transfer mode in which the voltage VaN is set high and the voltage VaP is set low to the ΔVbe transfer mode in which the voltage VaN is set low and the voltage VaP is set high. In the ΔVbe transfer mode, a voltage based on the differential voltage ΔVbe is subtracted from the voltage VaN and the voltage based on the differential voltage ΔVbe is added to the voltage VaP until the voltage Vc becomes low.

When a pulse density of the signal ΦD is D, C2/C1=G1, and C3/C1=G2, the following equation is satisfied.

$$D \cdot G2 \cdot Vbe1 = (1-D) \cdot G1 \cdot \Delta Vbe \quad (10)$$

Therefore, the pulse density D is calculated as follows.

$$D = G1 \cdot \Delta Vbe / (G1 \cdot \Delta Vbe + G2 \cdot Vbe1) \quad (11)$$

The equations (10) and (11) indicate that, at low temperature, with the differential voltage ΔVbe being also low and the voltage Vbe1 being high, the pulse density D also becomes low. At high temperature, with the differential voltage ΔVbe being also high and the voltage Vbe1 being low, the pulse density D also becomes high.

Note that the switches 15 to 18 cause the voltage VbeB to transition oppositely to the voltage VbeA. The switches 21 to 25 and the switches 31 to 35 cause the voltage VaP to transition oppositely to the voltage VaN.

As described above, at the temperature Ta, for example, a cycle of the pulse density D is one-third that of the signal Φ1 (D=2/6) as illustrated in FIG. 3.

Figure 4:
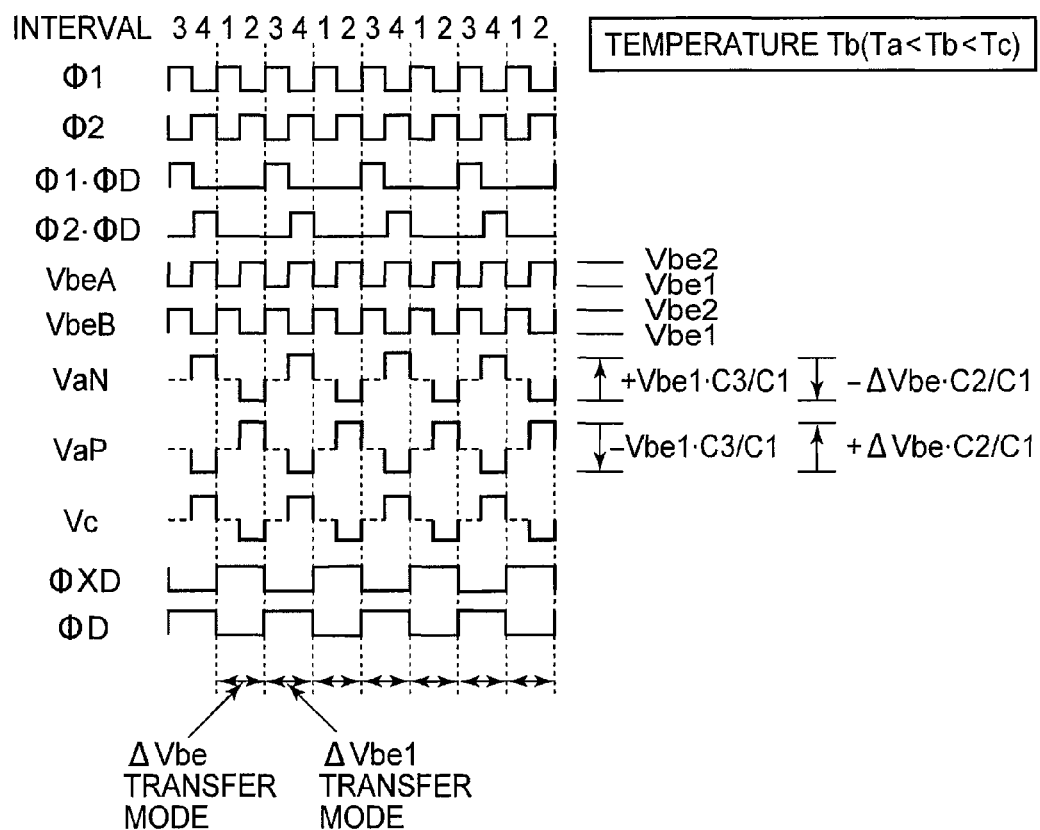
FIG. 4 is a time chart at a temperature Tb of the PDM output temperature sensor according to the first embodiment of the present invention.

Next, an operation of the PDM output temperature sensor at a temperature Tb, which is higher than the temperature Ta, according to the first embodiment of the present invention is described. FIG. 4 is a time chart at the temperature Tb.

[Operation in Intervals 1 and 2 (ΔVbe Transfer Mode)]

The operation in the intervals 1 and 2 at the temperature Tb corresponds to the operation in the intervals 1 to 4 at the temperature Ta.

In this case, with the temperature Tb being higher than the temperature Ta, the differential voltage ΔVbe at the temperature Tb is higher than the differential voltage ΔVbe at the temperature Ta as illustrated in FIG. 2. That is, the voltage VaN becomes low faster. Therefore, while it takes two cycles of the signal Φ1 for the voltage VaN to be a negative voltage with respect to the bias point at the temperature Ta, it takes only one cycle of the signal Φ1 at the temperature Tb. The same holds true for the voltage VaP.

[Operation in Intervals 3 and 4 (Vbe1 Transfer Mode)]

The operation in the intervals 3 and 4 at the temperature Tb corresponds to the operation in the intervals 5 and 6 at the temperature Ta.

As described above, at the temperature Tb, for example, a cycle of the pulse density D is a half that of the signal Φ1 (D=3/6) as illustrated in FIG. 4.

Figure 5:
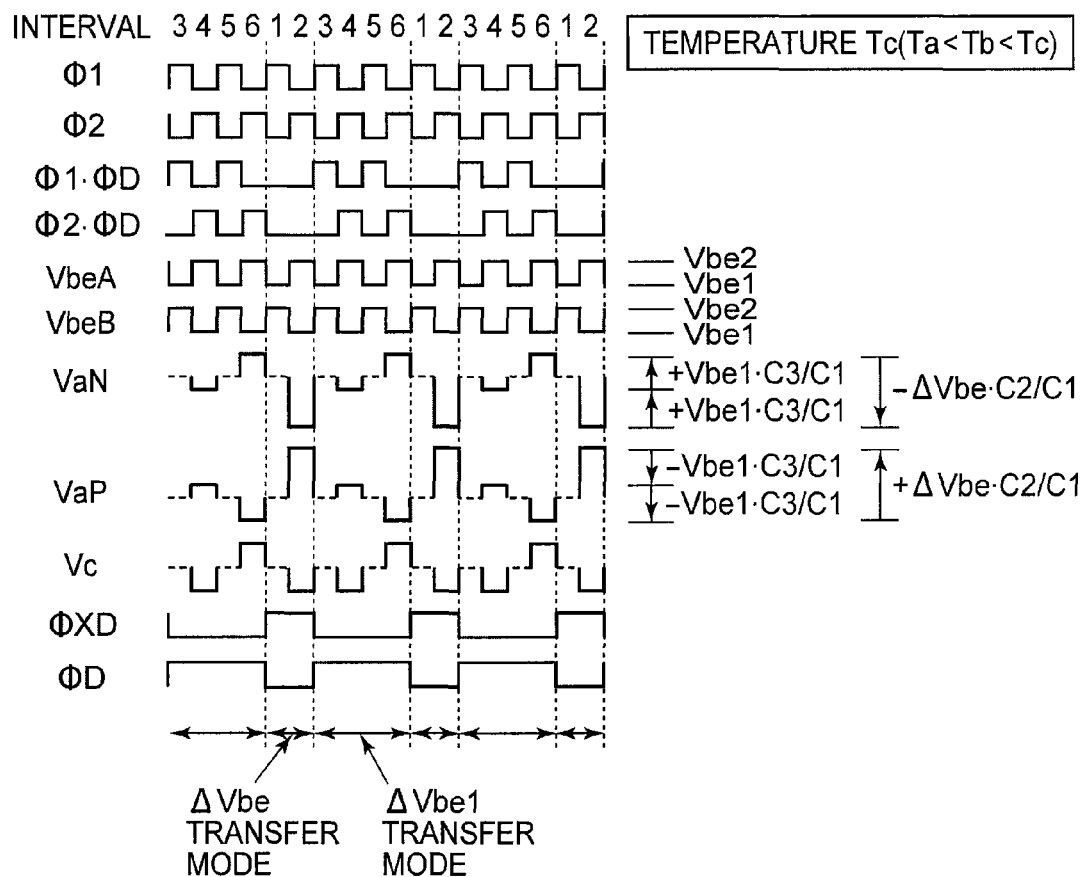
FIG. 5 is a time chart at a temperature Tc of the PDM output temperature sensor according to the first embodiment of the present invention.

Next, an operation of the PDM output temperature sensor at a temperature Tc, which is higher than the temperature Tb, according to the first embodiment of the present invention is described. FIG. 5 is a time chart at the temperature Tc.

[Operation in Intervals 1 and 2 (ΔVbe Transfer Mode)]

The operation in the intervals 1 and 2 at the temperature Tc corresponds to the operation in the intervals 1 and 2 at the temperature Tb.

[Operation in Intervals 3 to 6 (Vbe1 Transfer Mode)]

The operation in the intervals 3 to 6 at the temperature Tc corresponds to the operation in the intervals 3 and 4 at the temperature Tb.

In this case, with the temperature Tc being higher than the temperature Tb, the voltage Vbe1 at the temperature Tc is lower than the voltage Vbe1 at the temperature Tb as illustrated in FIG. 2. That is, the voltage VaN becomes high slower. Therefore, while it takes only one cycle of the signal Φ1 for the voltage VaN to be a positive voltage with respect to the bias point at the temperature Tb, it takes two cycles of the signal Φ1 at the temperature Tc. The same holds true for the voltage VaP.

As described above, at the temperature Tc, for example, the cycle of the pulse density D is two-thirds that of the signal Φ1 (D=4/6) as illustrated in FIG. 5.

As described above, the PDM output temperature sensor of the first embodiment of the present invention does not use a reference voltage circuit. Accordingly, the PDM output temperature sensor is reduced in area and consumption power correspondingly.

Also, with the PDM output temperature sensor not using a reference voltage circuit, there is no need for circuit technology for improving precision of a reference voltage output from the reference voltage circuit. Accordingly, a circuit design for the PDM output temperature sensor is simplified correspondingly.

Further, the amplifier 41 and the comparator 42 do not operate based on the reference voltage and hence are independent of fluctuation in reference voltage.

Still further, according to the first embodiment of the present invention, compared with a third embodiment of the present invention, fewer switches are provided between the node N1 and the node N2. Therefore, switching noise to the capacitor 27 is reduced, and precision of the voltage VaN is improved. The same holds true for the voltage VaP.

<Second Embodiment>

Figure 6:
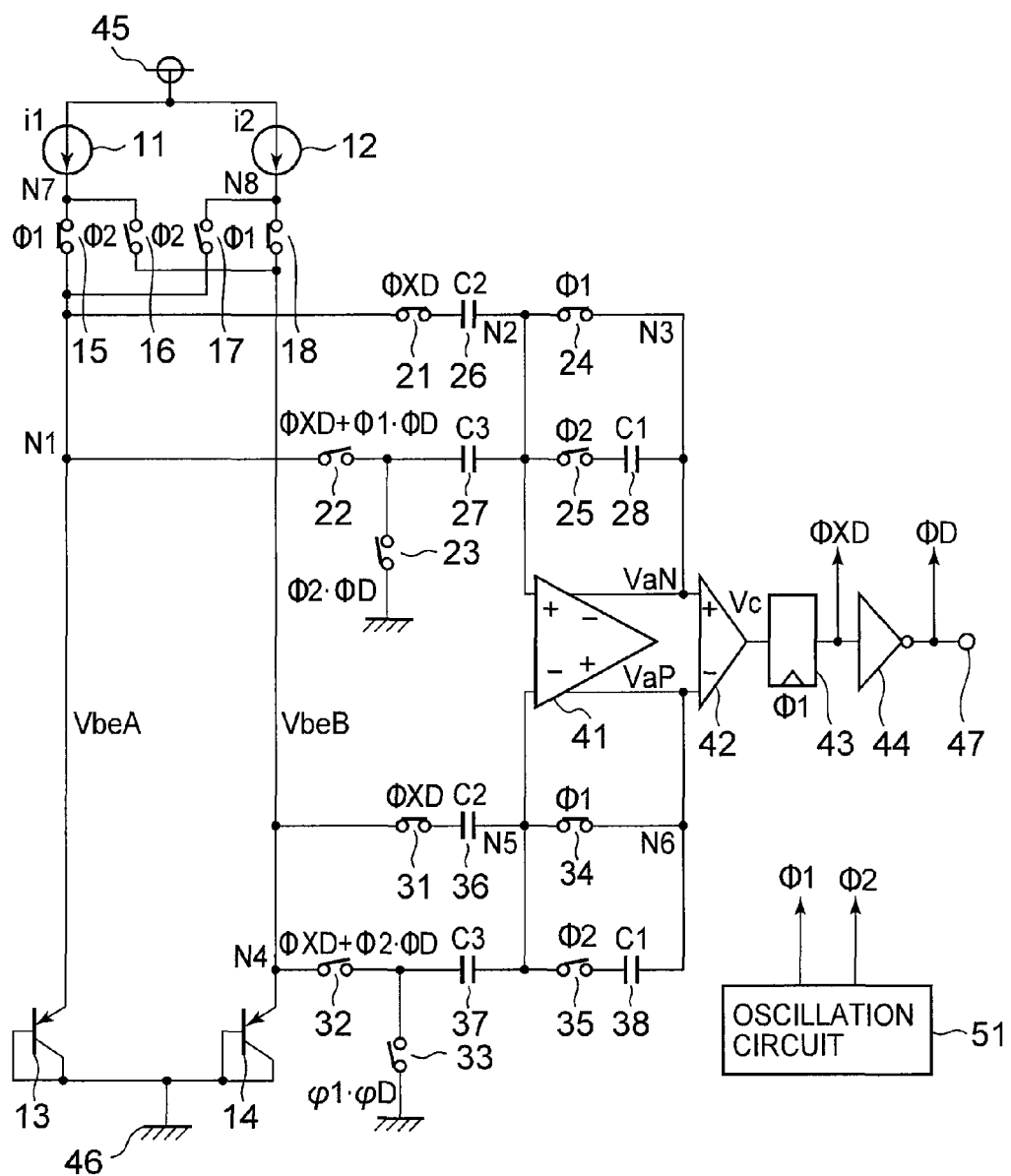
FIG. 6 is a block diagram illustrating of a PDM output temperature sensor according to a second embodiment of the present invention.

First, a structure of a PDM output temperature sensor according to a second embodiment of the present invention is described. FIG. 6 is a block diagram illustrating the PDM output temperature sensor according to the second embodiment of the present invention.

The PDM output temperature sensor according to the second embodiment of the present invention has the same circuit structure as the PDM output temperature sensor according to the first embodiment of the present invention. The PDM output temperature sensor according to the second embodiment of the present invention is different from the PDM output temperature sensor according to the first embodiment of the present invention in that the switch 22 is controlled by a signal ΦXD+Φ1·ΦD and the switch 32 is controlled by a signal ΦXD+Φ2·ΦD. The signal ΦXD+Φ1·ΦD is a signal obtained by a logical disjunction (OR) of the signal ΦXD and a signal obtained by a logical conjunction (AND) of the signal Φ1 and the signal ΦD, and the signal ΦXD+Φ2·ΦD is a signal obtained by a logical disjunction (OR) of the signal ΦXD and a signal obtained by a logical conjunction (AND) of the signal Φ2 and the signal ΦD.

The latch 43 transmits the signal ΦXD to the switch 21 and the switch 31, and transmits the signal ΦXD also to the switch 22 and the switch 32.

When each signal becomes high, the switches corresponding to the signal are turned ON. Also, when the signal Φ1 becomes high, the latch 43 stores and outputs a voltage Vc at the time point.

Figure 7:
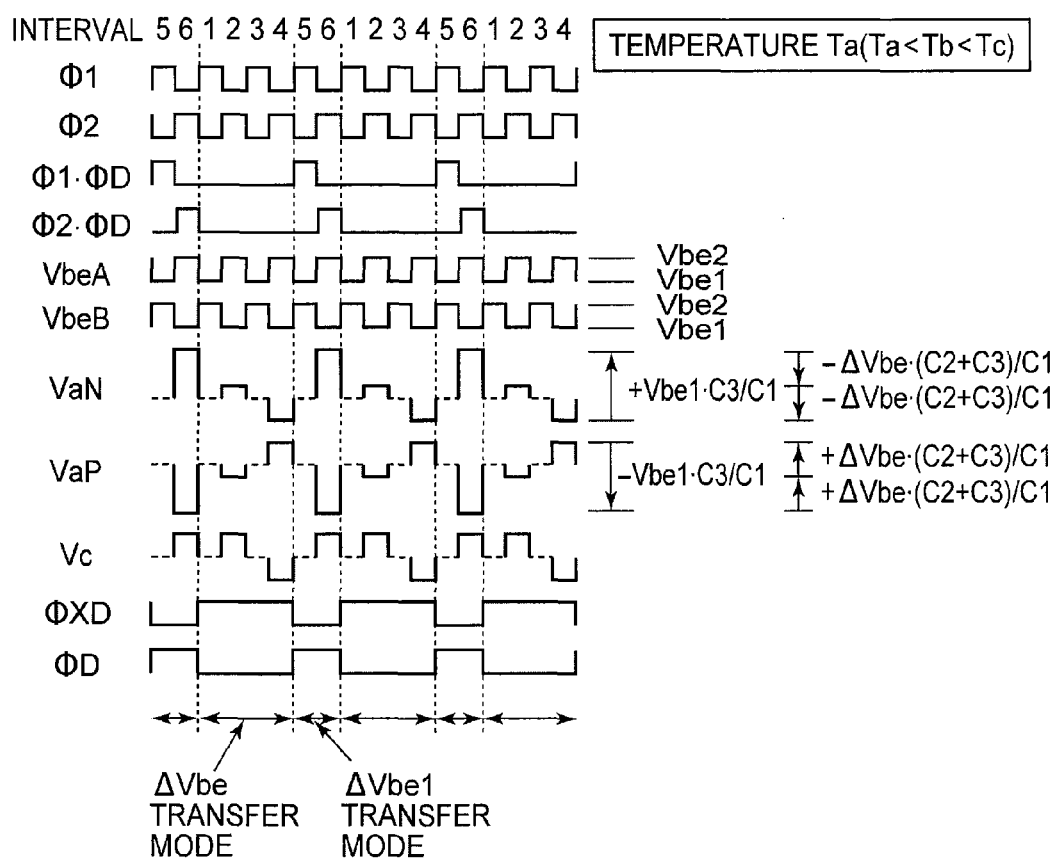
FIG. 7 is a time chart at the temperature Ta of the PDM output temperature sensor according to the second embodiment of the present invention.
Figure 8:
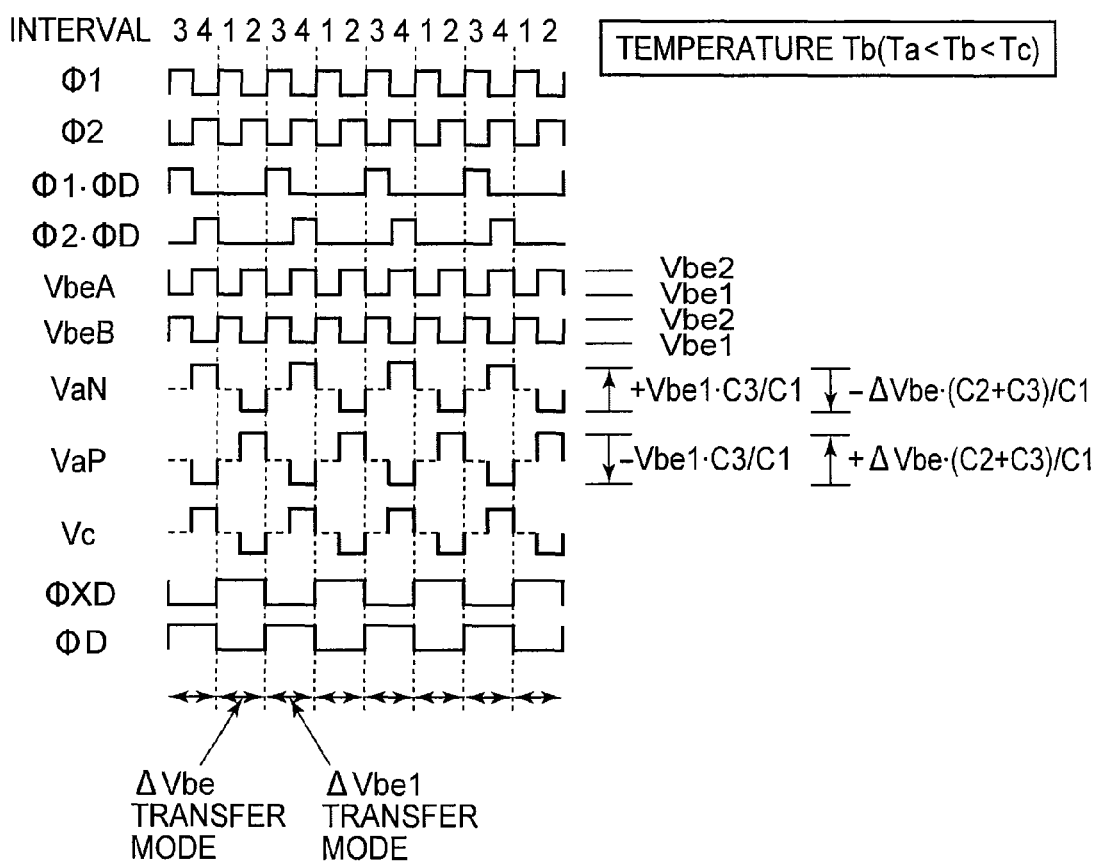
FIG. 8 is a time chart at the temperature Tb of the PDM output temperature sensor according to the second embodiment of the present invention.
Figure 9:
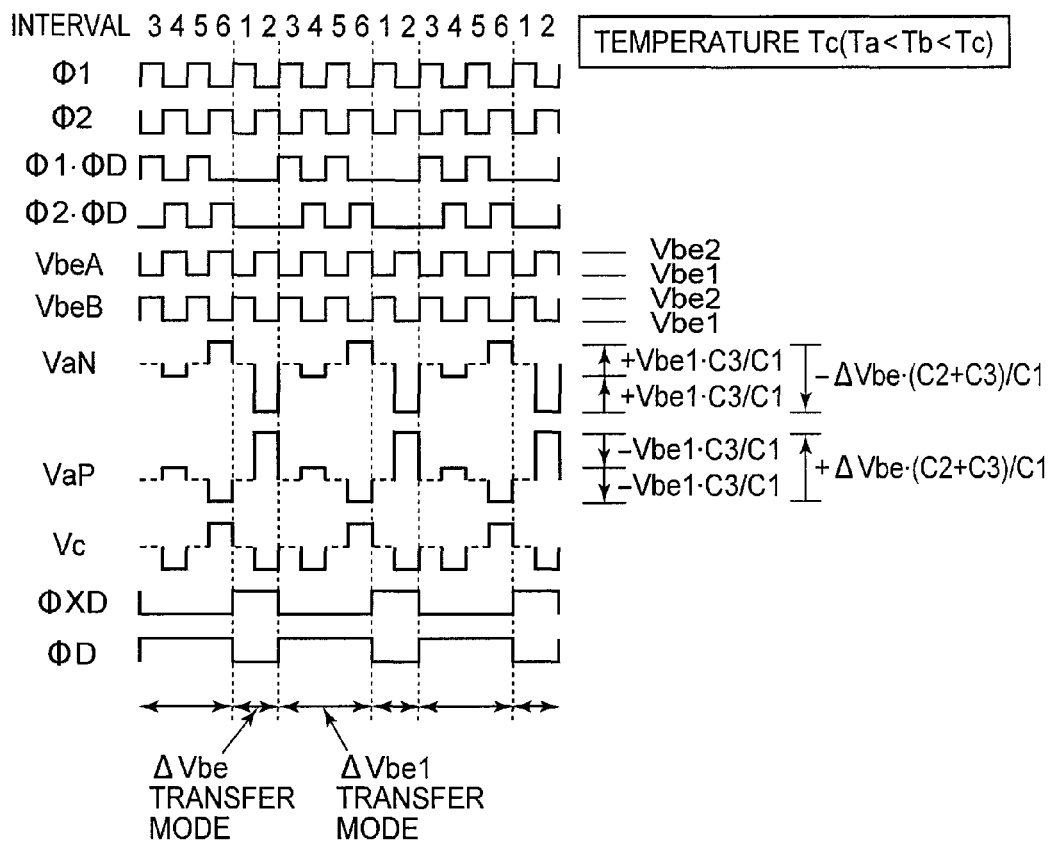
FIG. 9 is a time chart at the temperature Tc of the PDM output temperature sensor according to the second embodiment of the present invention.

Next, an operation of the PDM output temperature sensor according to the second embodiment of the present invention is described. FIG. 7 is a time chart at the temperature Ta according to the second embodiment of the present invention. FIG. 8 is a time chart at the temperature Tb according to the second embodiment of the present invention. FIG. 9 is a time chart at the temperature Tc according to the second embodiment of the present invention.

In the PDM output temperature sensor according to the first embodiment of the present invention, when the signal ΦXD becomes high and the signal ΦD becomes low so that the PDM output temperature sensor enters the ΔVbe transfer mode, only the capacitor 26 operates as input capacitance. Therefore, a capacitance value of the input capacitance is the capacitance value C2 of the capacitor 26. As illustrated in FIGS. 3 to 5, the voltage VaN is reduced by a voltage (ΔVbe·C2/C1) in one cycle of the signal Φ1 based on the capacitance value C2. However, in the PDM output temperature sensor according to the second embodiment of the present invention, when the PDM output temperature sensor enters the ΔVbe transfer mode, not only the capacitor 26 but both the capacitors 26 and 27 operate as the input capacitance. Therefore, the capacitance value of the input capacitance increases from the capacitance value C2 of the capacitor 26 to a total capacitance value (C2+C3) of the capacitors 26 and 27. As illustrated in FIGS. 7 to 9, the voltage VaN is reduced by a voltage (ΔVbe·(C2+C3)/C1) in one cycle of the signal Φ1 based on the capacitance value (C2+C3). The same holds true for the capacitor 36.

As described above, according to the PDM output temperature sensor of the second embodiment of the present invention, when the PDM output temperature sensor enters the ΔVbe transfer mode, not only the capacitor 26 but both the capacitors 26 and 27 operate as the input capacitance. Therefore, the capacitance value of the input capacitance increases from the capacitance value C2 of the capacitor 26 to the total capacitance value (C2+C3) of the capacitors 26 and 27. Accordingly, the capacitance value C2 of the capacitor 26 does not need to be high.

In addition, the PDM output temperature sensor of the second embodiment of the present invention includes few switches between the node N1 and the node N2. Therefore, switching noise to the capacitor 27 is reduced, and precision of the voltage VaN is improved. The same holds true for the voltage VaP.

<Third Embodiment>

Figure 10:
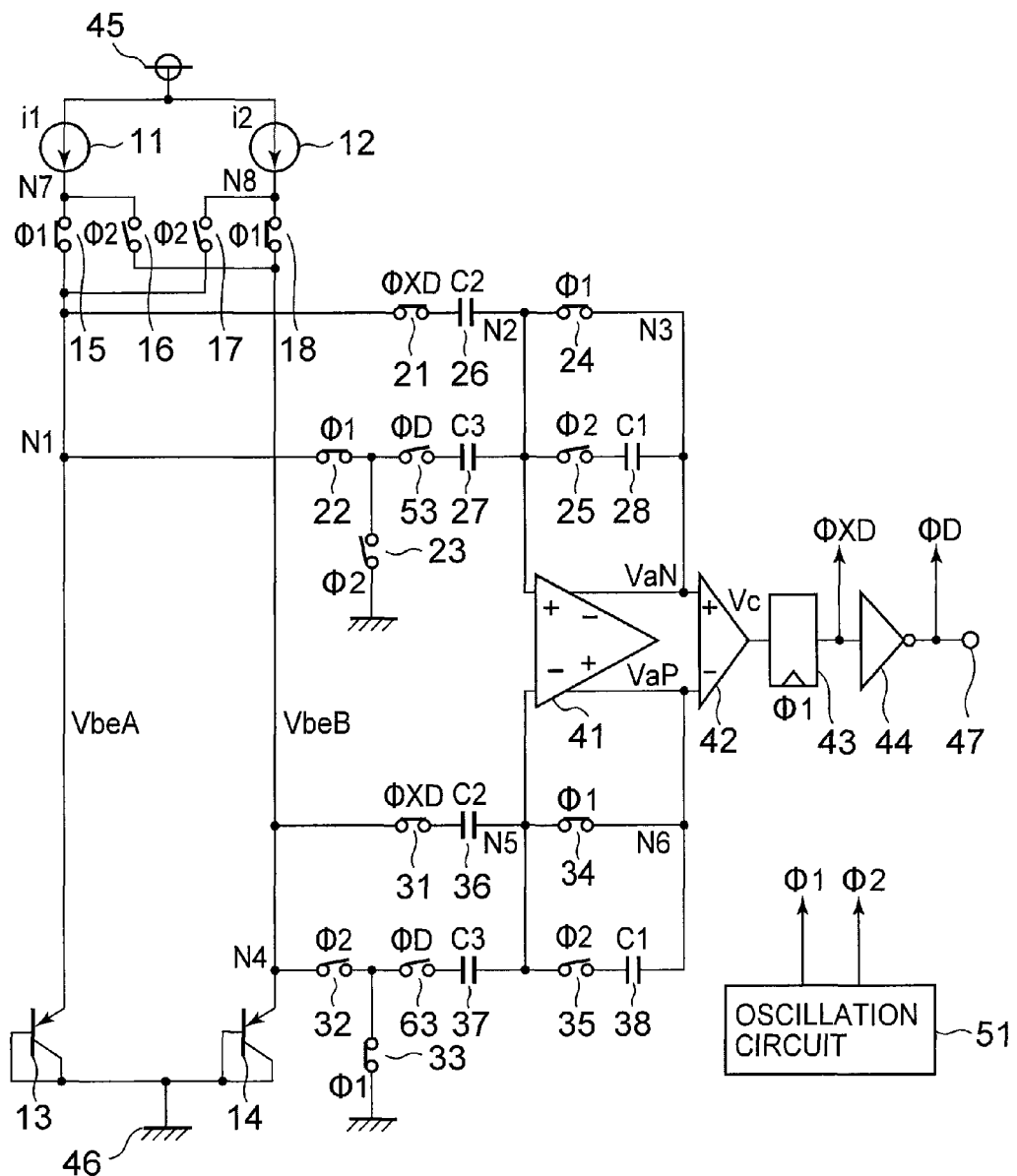
FIG. 10 is a block diagram illustrating a PDM output temperature sensor according to a third embodiment of the present invention.
Figure 11:
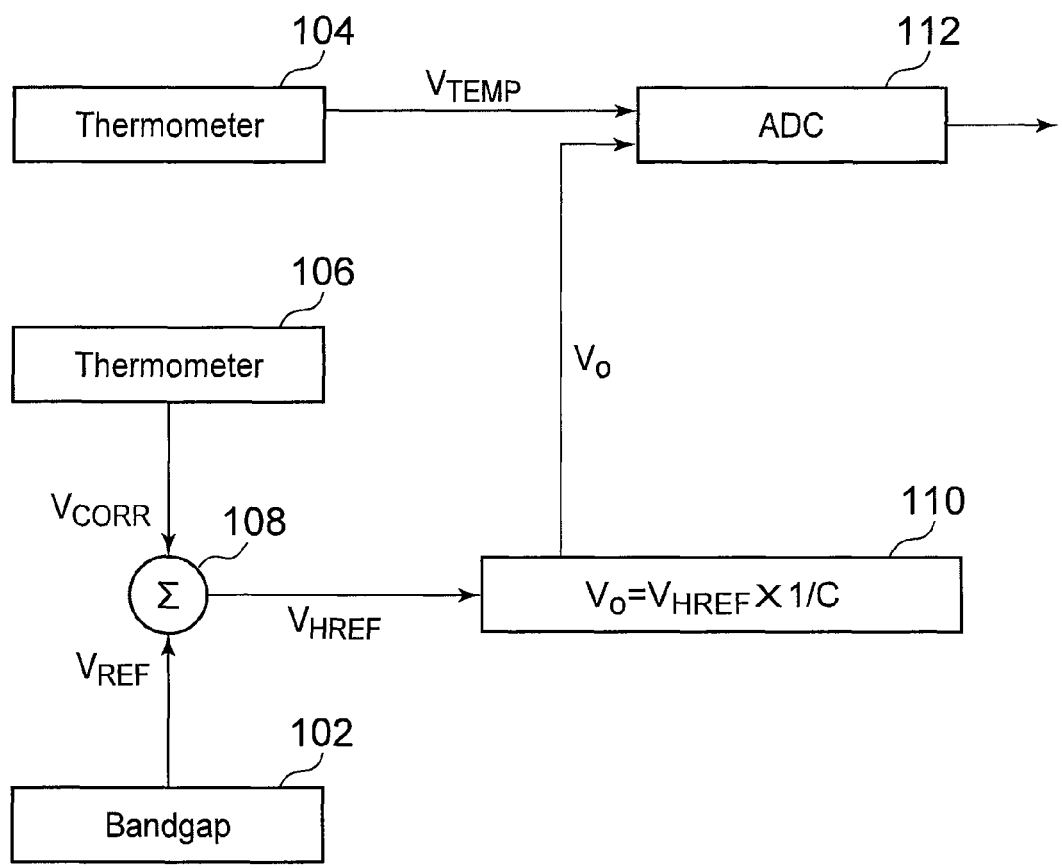
FIG. 11 is a block diagram illustrating a conventional temperature sensor.

First, a structure of a PDM output temperature sensor according to a third embodiment of the present invention is described. FIG. 10 is a block diagram illustrating the PDM output temperature sensor according to the third embodiment of the present invention.

In the PDM output temperature sensor according to the third embodiment of the present invention, a switch 53 and a switch 63 are added when compared with the first embodiment of the present invention.

The switch 22, the switch 53, and the capacitor 27 are provided between the node N1 and the node N2 in the stated order.

The switch 32, the switch 63, and the capacitor 37 are provided between the node N4 and the node N5 in the stated order.

The oscillation circuit 51 transmits a signal Φ1 to the switch 15, the switch 18, the switch 22, the switch 24, the switch 33, and the switch 34, the signal Φ1 to the latch 43, and a signal Φ2 to the switch 16, the switch 17, the switch 23, the switch 25, the switch 32, and the switch 35. The latch 43 transmits a signal ΦXD to the switch 21 and the switch 31. The inverter 44 transmits a signal ΦD to the switch 53 and the switch 63.

When each signal becomes high, the switches corresponding to the signal are turned ON. Also, when the signal Φ1 becomes high, the latch 43 stores and outputs a voltage Vc at the time point.

Next, an operation of the PDM output temperature sensor according to the third embodiment of the present invention is described.

In the first embodiment of the present invention, when the signal Φ1 and the signal ΦD become high, the switch 22 is turned ON to connect the node N1 to the capacitor 27. However, in the third embodiment of the present invention, when the signal ΦI and the signal ΦD become high, the switch 22 and the switch 53 are turned ON to connect the node N1 to the capacitor 27.

In the first embodiment of the present invention, when the signal Φ2 and the signal ΦD become high, the switch 23 is turned ON to connect the ground terminal 46 to the capacitor 27. However, in the third embodiment of the present invention, when the signal Φ2 and the signal ΦD become high, the switch 23 and the switch 53 are turned ON to connect the ground terminal 46 to the capacitor 27.

In the first embodiment of the present invention, when the signal Φ2 and the signal ΦD become high, the switch 32 is turned ON to connect the node N4 to the capacitor 37. However, in the third embodiment of the present invention, when the signal Φ2 and the signal ΦD become high, the switch 32 and the switch 63 are turned ON to connect the node N4 to the capacitor 37.

In the first embodiment of the present invention, when the signal Φ2 and the signal ΦD become high, the switch 33 is turned ON to connect the node N4 to the capacitor 37. However, in the third embodiment of the present invention, when the signal ΦI and the signal ΦD become high, the switch 33 and the switch 63 are turned ON to connect the node N4 to the capacitor 37.

That is, as described above, the PDM output temperature sensor according to the third embodiment of the present invention operates as in the first embodiment of the present invention.

As described above, according to the third embodiment of the present invention, when compared with the first and second embodiments of the present invention, the switches and the signals for controlling the switches have a one-to-one correspondence. Therefore, the control circuit for controlling the switches is simplified.

What is claimed is:

1. A pulse density modulation (PDM) output temperature sensor comprising:
 a first constant current source provided between a power supply terminal and a seventh node;
 a second constant current source provided between the power supply terminal and an eighth node;
 a first switch provided between the seventh node and a first node;
 a second switch provided between the seventh node and a fourth node;
 a third switch provided between the eighth node and the first node;
 a fourth switch provided between the eighth node and the fourth node;
 a first PNP bipolar transistor having a base and a collector connected to a ground terminal, and an emitter connected to the first node;
 a second PNP bipolar transistor having a base and a collector connected to the ground terminal, and an emitter connected to the fourth node;
 a fifth switch and a first capacitor provided between the first node and a second node in the stated order;
 an eighth switch provided between the second node and a third node;
 a sixth switch and a second capacitor provided between the first node and the second node in the stated order;
 a ninth switch and a third capacitor provided between the second node and the third node in the stated order;
 a seventh switch provided between the ground terminal and a connection point between the sixth switch and the second capacitor;
 a tenth switch and a fourth capacitor provided between the fourth node and a fifth node in the stated order;
 a thirteenth switch provided between the fifth node and a sixth node;
 an eleventh switch and a fifth capacitor provided between the fourth node and the fifth node in the stated order;
 a fourteenth switch and a sixth capacitor provided between the fifth node and the sixth node in the stated order;
 a twelfth switch provided between the ground terminal and a connection point between the eleventh switch and the fifth capacitor;
 an amplifier having a non-inverting input terminal connected to the second node, an inverting input terminal connected to the fifth node, a non-inverting output terminal connected to the sixth node, and an inverting output terminal connected to the third node;
 a comparator having a non-inverting input terminal connected to the third node, and an inverting input terminal connected to the sixth node;
 a latch having an input terminal connected to an output terminal of the comparator;
 an inverter having an input terminal connected to an output terminal of the latch, and an output terminal connected to an output terminal of the PDM output temperature sensor; and
 an oscillation circuit for controlling each of the first switch, the second switch, the third switch, the fourth switch, the sixth switch, the seventh switch, the eighth switch, the ninth switch, the eleventh switch, the twelfth switch, the thirteenth switch, the fourteenth switch, and the latch.

2. A PDM output temperature sensor according to claim 1, wherein:
 the oscillation circuit transmits a first signal to the first switch, the fourth switch, the sixth switch, the eighth switch, the twelfth switch, the thirteenth switch, and the latch, and a second signal to the second switch, the third switch, the seventh switch, the ninth switch, the eleventh switch, and the fourteenth switch;
 the latch transmits a third signal to the fifth switch and the tenth switch; and
 the inverter transmits a fourth signal to the sixth switch, the seventh switch, the eleventh switch, and the twelfth switch.

3. A PDM output temperature sensor according to claim 1, wherein:
 the oscillation circuit transmits a first signal to the first switch, the fourth switch, the sixth switch, the eighth switch, the twelfth switch, the thirteenth switch, and the latch, and a second signal to the second switch, the third switch, the seventh switch, the ninth switch, the eleventh switch, and the fourteenth switch;
 the latch transmits a third signal to the fifth switch, the sixth switch, the tenth switch, and the eleventh switch; and
 the inverter transmits a fourth signal to the sixth switch, the seventh switch, the eleventh switch, and the twelfth switch.

4. A PDM output temperature sensor comprising:
 a first constant current source provided between a power supply terminal and a seventh node;
 a second constant current source provided between the power supply terminal and an eighth node;
 a first switch provided between the seventh node and a first node;
 a second switch provided between the seventh node and a fourth node;
 a third switch provided between the eighth node and the first node;

a fourth switch provided between the eighth node and the fourth node;
a first PNP bipolar transistor having a base and a collector connected to a ground terminal, and an emitter connected to the first node;
a second PNP bipolar transistor having a base and a collector connected to the ground terminal, and an emitter connected to the fourth node;
a fifth switch and a first capacitor provided between the first node and a second node in the stated order;
an eighth switch provided between the second node and a third node;
a sixth switch, a fifteenth switch, and a second capacitor provided between the first node and the second node in the stated order;
a ninth switch and a third capacitor provided between the second node and the third node in the stated order;
a seventh switch provided between the ground terminal and a connection point between the sixth switch and the second capacitor;
a tenth switch and a fourth capacitor provided between the fourth node and a fifth node in the stated order;
a thirteenth switch provided between the fifth node and a sixth node;
an eleventh switch, a sixteenth switch, and a fifth capacitor provided between the fourth node and the fifth node in the stated order;
a fourteenth switch and a sixth capacitor provided between the fifth node and the sixth node in the stated order;
a twelfth switch provided between the ground terminal and a connection point between the eleventh switch and the fifth capacitor;
an amplifier having a non-inverting input terminal connected to the second node, an inverting input terminal connected to the fifth node, a non-inverting output terminal connected to the sixth node, and an inverting output terminal connected to the third node;
a comparator having a non-inverting input terminal connected to the third node, and an inverting input terminal connected to the sixth node;
a latch having an input terminal connected to an output terminal of the comparator;
an inverter having an input terminal connected to an output terminal of the latch, and an output terminal connected to an output terminal of the PDM output temperature sensor; and
an oscillation circuit for controlling each of the first switch, the second switch, the third switch, the fourth switch, the sixth switch, the seventh switch, the eighth switch, the ninth switch, the eleventh switch, the twelfth switch, the thirteenth switch, the fourteenth switch, and the latch.

5. A PDM output temperature sensor according to claim 4, wherein:
the oscillation circuit transmits a first signal to the first switch, the fourth switch, the sixth switch, the eighth switch, the twelfth switch, the thirteenth switch, and the latch, and a second signal to the second switch, the third switch, the seventh switch, the ninth switch, the eleventh switch, and the fourteenth switch;
the latch transmits a third signal to the fifth switch and the tenth switch; and
the inverter transmits a fourth signal to the fifteenth switch and the sixteenth switch.

\* \* \* \* \*